Oct. 13, 1959
C. L. COOK
2,908,339
PLOW SHARE
Filed July 18, 1955
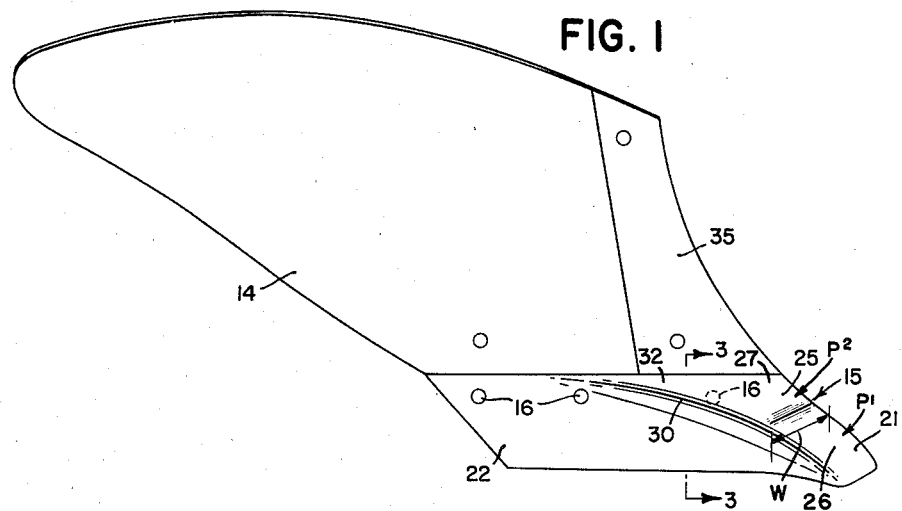
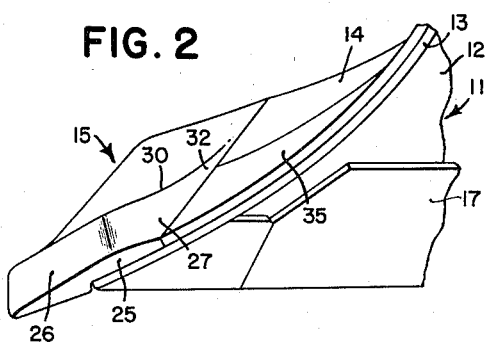
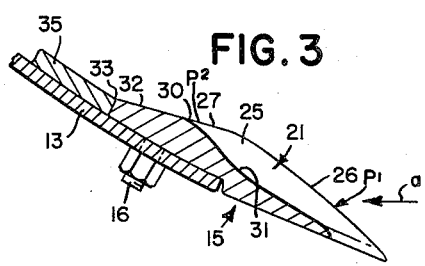
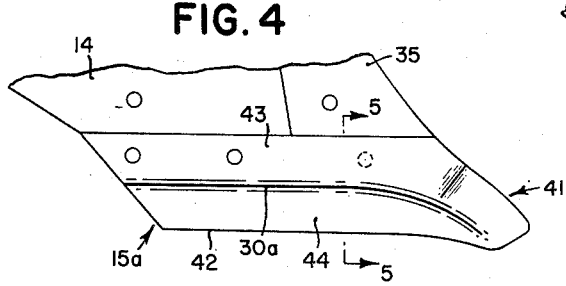
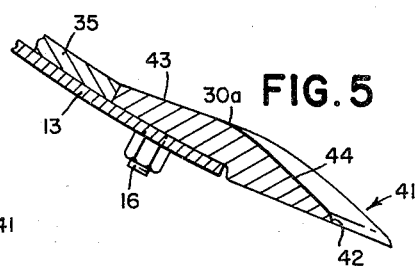
INVENTOR.
CURTISS L. COOK
BY
ATTORNEYS

United States Patent Office 2,908,339
Patented Oct. 13, 1959

2,908,339

PLOW SHARE

Curtiss L. Cook, Syracuse, N.Y., assignor, by mesne assignments, to Deere & Company, a corporation of Delaware Application July 18, 1955, Serial No. 522,803

1 Claim. (Cl. 172—754)

The present invention relates, generally, to agricultural implements for and more particularly to moldboard plows.

The objects and general nature of the present invention is the provision of a new and improved share for moldboard plows in which the share is formed and shaped in a special way, first, to provide for a smooth movement or flow of soil over the share and associated moldboard in operation and, second, to protect the moldboard from excessive wear, especially when used under adverse conditions, such as in a highly abrasive soil, hard ground, and the like.

More specifically, it is a feature of this invention to provide a flat or plate type share of the throw-away variety in which the share is formed with a thickened point or nose section, which thickened portion extends into the wing section of the share and is shaped and located so as to protect the adjacent portions of the moldboard from excessive wear. Generally speaking, the thickened portion of the share is so formed as to form a soil-engaging rib that extends generally in the direction of soil flow and upwardly and furrowwardly from the thickened point to points adjacent the moldboard.

A further feature of this invention is a provision of a share of the cast type, having a thickened point section, with the thickened portion extending into the wing section of the share and providing, adjacent the cutting edge of the share, a soil-displacing rib having a surface that is inclined so as to act to lift the furrow slice generally away from the moldboard but without entirely removing the pressure of the furrow slice from the moldboard, thereby providing for the retention of good scouring characteristics while at the same time protecting the moldboard from excessive wear. According to the principles of the present invention, this is provided by means of a thickened section of the share with an upper surface so formed that the portion rising from the cutting edge of the share is inclined at a relatively steep angle while the upper or rearward portions of the share are formed at a lesser angle, blending into the surface of the moldboard at their meeting edges so as to provide for reducing, but not entirely eliminating, the pressure of the soil against the adjacent portions of the moldboard.

These and other objects and advantages of the present invention will be apparent to those skilled in the art after a consideration of the following detail description taken in conjunction with the accompanying drawings, in which:

Fig. 1 is a perspective view of a moldboard plow bottom in which the principles of the present invention have been incorporated.

Fig. 2 is an enlarged fragmentary perspective view of the plow bottom shown in Fig. 1, showing the point section of the share, with the associated portions of the frog, moldboard, landside and other parts.

Fig. 3 is an enlarged sectional view taken generally along the line 3—3 of Fig. 1.

Fig. 4 is a fragmentary perspective view, somewhat similar to Fig. 1, showing a modified form of share construction.

Fig. 5 is a sectional view taken along the line 5—5 of Fig. 4.

Referring first to Figures 1 and 2, the plow bottom in which the principles of the present invention have been incorporated has been illustrated as incorporated in a plow having a frog or supporting structure 11 including a landside-receiving plate 12 and a moldboard-receiving plate 13, the edge of which appears in Fig. 2, a moldboard 14, and a soil-entering share 15 fixed in any suitable way to the lower portions of the frog 11. Secured to the landside plate 12 is a landside 17, and the share 15 is connected by bolts or threaded studs 16 to the lower portions of the moldboard-receiving plate 13 of the frog 12, as best shown in Fig. 3.

The share 15 constitutes the principal portion of the present invention and includes a point section 21 that extends upwardly and rearwardly from the front edge of the point or nose substantially to the lower edge of the moldboard. The share 15 also includes a wing section 22 that extends rearwardly and furrowwardly. The share 15 is of the flat plate or throw-away variety and preferably is made as a casting so as to provide a part that is exceedingly resistant to abrasion.

The point section 21 of the share is thickened, as indicated at 25, Fig. 3, and is formed into two portions; namely, a front portion $P^1$ having an upwardly facing surface 26 that extends upwardly and rearwardly at an angle with respect to the direction of soil pressure, indicated by the arrow $a$ in Fig. 3, and a second or rear thickened portion $P^2$ having an upwardly facing surface 27, the angle of which is smaller, relative to the direction $a$, than the angle of the surface 26 but still a positive angle in the sense that the soil pressure of the furrow slice acts, when the plow is drawn through the ground, with a positive pressure against the surface 27 although to a lesser degree than the pressure with which the furrow slice bears against the forward or lower surface 26. It will be noted from Fig. 3 that the upper surface 27 of the point section, where the upper edge of the share meets the lower edge of the moldboard 14, shown at 33, blends smoothly into the upper surface of the moldboard.

The rear thickened point portion, the portion having the rear upper angled face 27, as will be seen from Figs. 1 and 2, extends furrowwardly from the landside edge of the plow well into the wing section of the share, forming a rib or ridge, indicated at 30 in Fig. 1, that extends upwardly and furrowwardly generally in line with the direction of soil travel over the plow. This second portion, forming the rib or ridge 30 in the wing of the share, has a width (indicated at $w$ in Fig. 1) that progressively increases from the front portion $P^1$ rearwardly to the edge of the moldboard where the lateral width of the portion $P^2$ is about half the length of the share 15. The upper face of this widened portion has upper surface characteristics similar to that described for the point. That is, referring to Fig. 3, the surface 31 leading upwardly from the lower edge of the share to the portion of greatest thickness lies at a relatively sharp angle with respect to the direction of soil pressure thereagainst, and the upper surface 32 lies at a lesser angle, blending smoothly into the adjacent surface of the moldboard at the line of juncture, shown at 33. Thus, the surfaces 27 and 32, as shown in Fig. 2 are substantially coextensive, and the rib or ridge 30 extending from the point into the wing of the share causes an increased soil pressure at the zone of the thickened sections, the soil pressure being reduced upwardly of the thicker portion of the share and where the upper edge of the latter blends into the surface of the lower edge of the moldboard, but not entirely eliminated. In this way, the moldboard 14, and particularly the moldboard shin 35 (Fig. 1) that commonly forms a part of the plow, is protected against excessive wear due, for example, to operating under abrasive soil conditions and the like.

In the modified form of the invention shown in Figs. 4 and 5, the thickened portion 30a of the share 15a extends from the point section 41 upwardly and furrowwardly for substantially the entire length of the share, thus providing a soil pressure increasing ridge or rib that extends more or less alongside the cutting edge 42 of the share 15a, but, like the share construction described above, the curvature of the surface portions 43 about the rib or ridge 30a has a lesser inclination than the inclination of the surface 44 of the share below the rib or ridge 30a. The upper surface 43 blends smoothly into the upper surface of the lower edge section of the moldboard 14. The form of the invention shown in Figs. 4 and 5 provides a somewhat greater degree of protection against excessive wearing of the moldboard and shin and is preferred where soil conditions are extremely difficult. The form of the invention shown in Figs. 1-3 provides adequate protection for the moldboard and shin under most conditions.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

A plow comprising a frog, a moldboard fixed to the upper portion of the frog and having a lower share-receiving edge, and a share comprising a point section and a wing section, the upper edges of said sections being in lateral alignment and fitting against the lower edge of said moldboard, the point section being thickened relative to the wing section from front to rear so as to present a forward thickened portion having a soil-contacting surface that extends upwardly from the forward edge of the point section at an acute vertical angle relative to the direction of soil pressure for approximately half the fore-and-aft width of the share, and a second thickened portion rearwardly of said forward thickened portion having an upper soil-contacting surface that also extends upwardly from said forward thickened portion at a reduced angle relative to the direction of soil pressure, said second thickened portion continuing generally rearwardly to the edge of the share that engages the lower edge of the lateral moldboard, the width of said second thickened portion progressively increasing upwardly from the rear portion of the forward thickened section so that, at the juncture between the rear edge of the share and the lower edge of the moldboard, the width of the second thickened portion substantially exceeds the width of the forward thickened portion at the forward point of the share, the two thickened portions forming a rib-like section that extends upwardly and furrowwardly generally in line with the direction of soil travel over the plow share, and the thickness of said wider second thickened portion at the upper edge of the share where the latter is joined to the moldboard being substantially equal to the thickness of the lower forward edge of the moldboard.

References Cited in the file of this patent

UNITED STATES PATENTS

| | | |
|---|---|---|
| 273,316 | Rollins | Mar. 6, 1883 |
| 321,189 | Casaday | June 30, 1885 |
| 392,047 | Lysle | Oct. 30, 1888 |
| 679,014 | Boger | July 23, 1901 |
| 877,359 | McWane | Jan. 21, 1908 |
| 1,019,900 | Kline | Mar. 12, 1912 |
| 1,330,812 | Lilly | Feb. 17, 1920 |
| 1,661,942 | Hawkins | Mar. 6, 1928 |
| 2,063,688 | Lier | Dec. 8, 1936 |
| 2,757,594 | Tanke | Aug. 7, 1956 |

FOREIGN PATENTS

| | | |
|---|---|---|
| 755,558 | Germany | Nov. 24, 1952 |